(12) United States Patent
Dobberstein

(10) Patent No.: US 6,789,861 B1
(45) Date of Patent: Sep. 14, 2004

(54) SUPPORT SYSTEM FOR COOKING ITEMS IN A BAKING OVEN

(75) Inventor: Klaus Dobberstein, Beselich (DE)

(73) Assignee: Accuride International GmbH, Diez (DE)

( * ) Notice: Subject to any disclaimer, the term of this patent is extended or adjusted under 35 U.S.C. 154(b) by 0 days.

(21) Appl. No.: 10/111,523

(22) PCT Filed: Oct. 13, 2000

(86) PCT No.: PCT/DE00/03661

§ 371 (c)(1),
(2), (4) Date: Jul. 8, 2002

(87) PCT Pub. No.: WO01/30162

PCT Pub. Date: May 3, 2001

(30) Foreign Application Priority Data

Oct. 25, 1999 (DE) .......................................... 199 51 267

(51) Int. Cl.[7] .............................................. A47B 88/00
(52) U.S. Cl. .................................................. 312/330.1
(58) Field of Search ............................. 312/330.1, 333, 312/334.4, 334.7, 334.8, 350

(56) References Cited

U.S. PATENT DOCUMENTS 2,644,588 A * 7/1953 Brown ........................ 108/102
2,911,276 A * 11/1959 Heir ............................ 312/350
4,872,734 A   10/1989 Rechberg

FOREIGN PATENT DOCUMENTS

| DE | 7708782.02 |   | 9/1977 | |
|----|-----------|---|--------|---|
| DE | 3141158 | * | 5/1983 | .............. 312/334.4 |
| DE | 4446757 |   | 6/1996 | |
| EP | 0407742 |   | 1/1991 | |
| EP | 0931985 |   | 7/1999 | |
| EP | 0952403 |   | 10/1999 | |
| GB | 910103 | * | 11/1962 | ................. 312/350 |
| GB | 2196109 A |   | 4/1988 | |

* cited by examiner

*Primary Examiner*—Jose V. Chen
(74) *Attorney, Agent, or Firm*—Howard M. Ellis

(57) ABSTRACT

A product support system for an oven has at least one product support, at least one pair of telescopic guides (23), each of which has at least one internal track and one external track, and wall-mounted holders (24, 25), arranged on the side walls (1a) of the oven muffle, which are designed for a releasable attachment of the telescopic guides (23) at different levels of the oven muffle, the product support being housed above the telescopic guides (23) in the oven muffle able to be pulled out from the latter. In order to create a product support system in which only the minimum necessary number of telescopic guides is present in the oven and a simple and comfortable change of levels of the product supports is nevertheless possible without time-consuming disassembly work, the product support is connected in fixed or releasable manner, as a product support unit which can be removed from the oven, to the pair of telescopic guides (23).

22 Claims, 7 Drawing Sheets

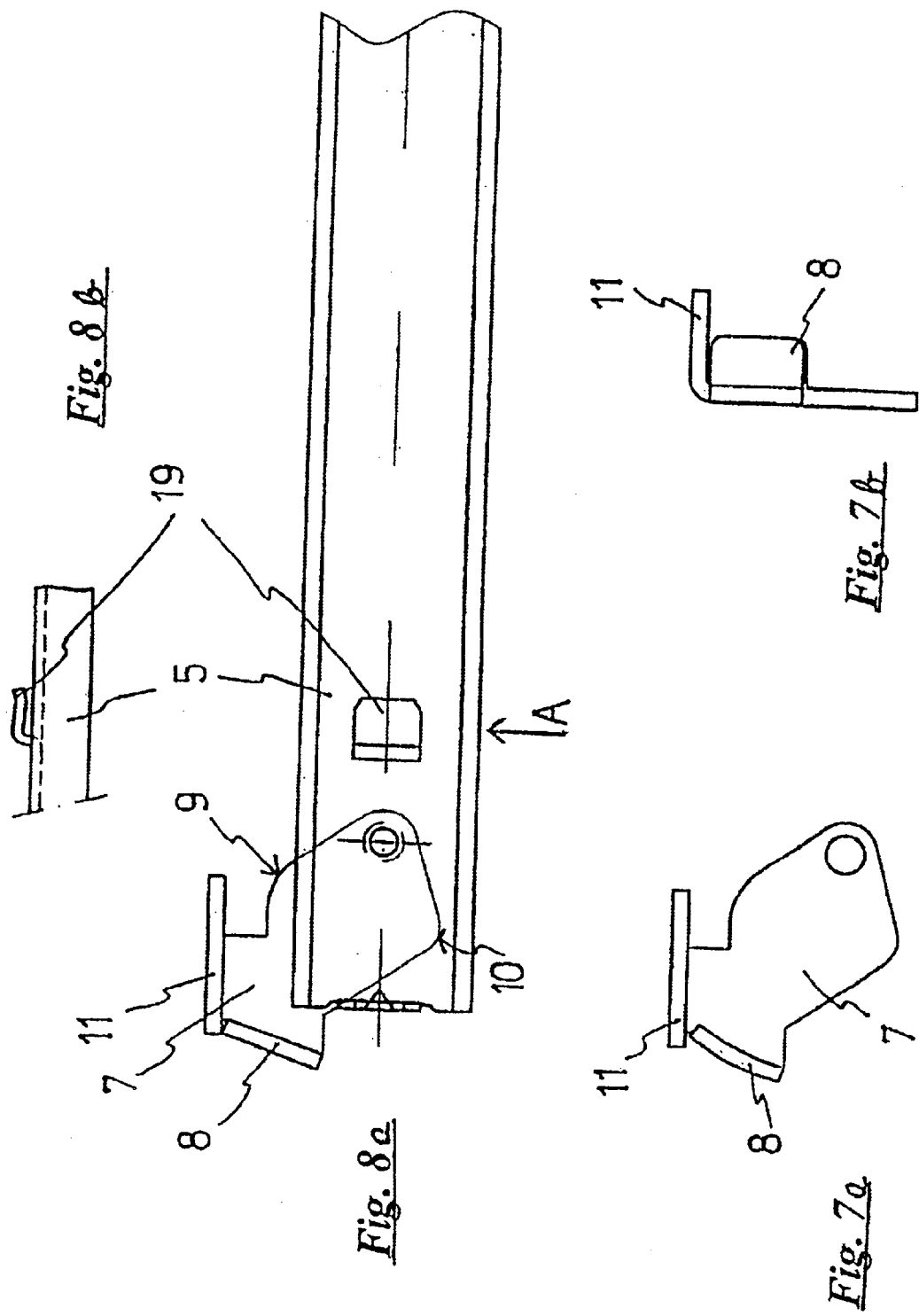

SUPPORT SYSTEM FOR COOKING ITEMS IN A BAKING OVEN

CROSS REFERENCE TO RELATED APPLICATIONS

The present application claims benefit to International Application No. PCT/DE00/03661, filed on Oct. 13, 2000; said International Application claims priority from German Patent Application No. 199 51 267.1, filed Oct. 25, 1999.

FIELD OF THE INVENTION

The invention relates to a product support system for an oven with at least one product support, at least one pair of telescopic guides each of which has at least one internal track and one external track, and wall-mounted holders arranged on the side walls of the baking muffle, which are designed for a releasable attachment of the telescopic guides at different levels of the oven muffle, the product support being housed over the telescopic guides in the oven muffle able to be pulled out from the latter.

By the expression "product support" is meant the following: all the inserts which are normally used in ovens, such as baking sheets, grills, baking dishes etc. The inside of an oven or cooker is formed by the so-called baking muffle or muffle. If the expression "at the back" is used in the following in relation to the oven, the product support or the telescopic guides, this refers to an area near to the back wall of the muffle, or, in the case of a part which is introduced into the oven, the area which is brought near to the back wall of muffle. "At the front" means the area near the mouth of the muffle or oven. In the following the expression "side wall" refers to the wall laterally limiting the inside of the oven. This can be the side wall of the oven muffle itself. However, there can also be a wall additionally arranged in the oven in front of the actual muffle side wall, a block, a folded or bent steel sheet, a profile or other lateral attachment device, as is normal in some ovens.

BACKGROUND OF THE INVENTION

In known ovens the product support is guided in grooves which are developed in the side wall. Several grooves are provided on both sides at different heights or levels so that the product support can be introduced into the oven muffle at different heights or so that several product supports can be accommodated in the oven at the same time. The sliding behavior of the product supports in such grooves depends on the surface properties of the surfaces sliding on each other and the loading of the product support and is comparatively poor. In other known ovens, grids with horizontal bars, on which the product supports are guided, are arranged in front of the side walls. Due to the smaller bearing surface of the mostly round horizontal grid bars, the sliding behavior is somewhat improved vis-à-vis grooves. Both previously mentioned guide devices for product supports have the disadvantage that the product support can only be pulled a certain distance out of the oven before it tilts downwards or has to be held at the front. Although the upper limits of the grooves, or other horizontal grid bars fitted a small distance above the product carrier, do offer some help in preventing the product carrier from tilting downwards, and thus make it possible to pull it out for a somewhat greater distance, such arrangements do not permit the product support to be fully pulled out in front of the muffle without the product having to be held by someone.

In the case of improved ovens telescopic guides, onto the movable track of which a product support can be placed, are attached to the side wall or to a grid. If the telescopic guides have one or more center tracks between the stationary track and the movable track on which the product support rests, then the telescopic guides can be pulled out far enough for the product support to be able to be pulled completely out of the oven in front of the muffle. It is furthermore known that the product support lying on the movable telescopic track is furthermore housed slidable on this track so that, after the telescopic guide has been completely pulled out, it can be pulled further along the track until it is in front of the baking oven muffle. This allows the use of telescopic guides with only two tracks, which is advantageous in terms of cost. Because of their smooth-running properties, the telescopic guides facilitate the pulling-out and pushing-in of the product support generally and guarantee stability and safeguard against downward tilting of the product support in the pulled-out position. In order to be able to accommodate several product supports in one oven or in order to be able to position one product support at different levels it is necessary in the previously mentioned ovens that a pair of telescopic guides be provided at each level, which in turn increases the cost for such ovens. Furthermore, both the used and the unused telescopic guides take up a lot of room in the oven muffle, which means a poorer circulation of air in fan-assisted stoves. As telescopic guides are made of metal as a rule, they possess a high thermal capacity. As the telescopic guides which are not used are also heated in such ovens, a certain amount of thermal energy flows unnecessarily into these unused telescopic guides and thus increases the energy consumption of such ovens. A further disadvantage is that the telescopic guides partly cover the lighting often arranged on the side in the oven muffle and thus adversely affects the view in the oven. Ovens are also known in which the telescopic guides on the side wall are attached so as to be releasable, e.g. by means of screws. Thus the telescopic guides can be assembled as needed at certain levels and disassembled and the presence of unused telescopic guides in the oven is avoided. If telescopic guides are not arranged at every level in the oven then it is not possible in such ovens to adjust the height of the product support during baking or roasting. To do this, the telescopic guides would firstly have to be dismantled and then reassembled at another level. This is time consuming and impractical and represents a handling problem as the product support has to firstly be removed from the oven and placed somewhere else and the telescopic guides are very hot. It would be a waste of energy, and also very inexpedient for the baking or roasting process, if the telescopic guides first had to be left to cool down for a time before disassembly.

SUMMARY OF THE INVENTION

The object of the present invention is to prepare a product support system of the type mentioned at the start in which only the minimum necessary number of telescopic guides is present in the oven and a simple and comfortable change of the levels of the product supports is nevertheless possible without time consuming disassembly work.

This object is achieved by a product support system of the type mentioned at the start in which the product support is connected in fixed or releasable manner, as a product support unit which can be removed from the oven, to the pair of telescopic guides.

Each product support which is pushed into the oven is connected to the necessary pair of telescopic guides to form a product support unit. Product support and telescopic guides are thus introduced into the oven, and also removed again, as one unit. The telescopic guides are each attached laterally to the product support. The attachment can be developed in a non-releasable manner, e.g. by welding, riveting or otherwise. A releasable connection can be carried out by screwing, plug insertion, clamping, locking or in other ways. A releasable connection has the advantage that the unit of product support and telescopic guides can be broken down into these individual components in order to more easily clean them separately. Furthermore a small number of telescopic guides can thereby be used for very different product supports. Normally no more than two or three product supports are pushed into an oven at the same time. However, in most cases many different types of product supports are present for different uses, such as baking sheets, grills, drip trays etc., which can then be equipped when needed with the telescopic guides.

By "internal track" is meant herein the movable track of a telescopic guide which, in relation to the muffle side wall, faces the inside of the oven. The connection between product support and telescopic guide takes place expediently via the internal track. By "external track" is meant the stationary track of the telescopic guides which in the oven muffle is attached in a releasable manner to the side walls or the wall-mounted holders provided for this. Wall-mounted holders can be apertures, slits or recesses provided in the side walls, in which the telescopic guides are suspended, locked or otherwise secured. However, separate attachment devices arranged on the side walls can also be provided as wall-mounted holders. Furthermore, grids arranged in front of the side walls or folded sheets with corresponding attachment devices can also serve as wall-mounted holders.

In one version of the invention the wall-mounted holders have, near to the muffle rear wall, projections or recesses which are designed to receive the external tracks of the telescopic guides or holding latches provided at the rear ends of the external tracks by pushing in a horizontal direction. It is furthermore advantageous if, near to the mouth of the muffle, the wall-mounted holders have side-wall openings and the external tracks of the telescopic guides bayonets or similar attachment devices, such as latches, hooks or projections, called "bayonet" in the following, which are designed such that the bayonets engage with the side-wall openings and can be locked to arrest the external tracks in horizontal direction. In this version the product support unit is attached laterally above the external tracks of the telescopic guides on both sides in each case in the rear and front areas of the oven muffle. The attachment in the rear area takes place by insertion of the external tracks or a latch provided on it into a holder or aperture provided for it in horizontal direction. This rear housing of the product support is developed such that the product support is secured in this rear area against a vertical movement at the corresponding level and is supported downwards. The releasable attachment of the external track in the front area likewise supports the product support downwards and arrests the external track in the horizontal direction at the same time. This prevents the product support together with the entire telescopic guide from being pulled out of the oven if, when baking or cooking, only the product support is to be pulled forward in order to inspect or work on the product. To insert the complete product support unit, the telescopic guide is thus firstly pushed into the corresponding housing in the back area, and then arrested by locking of the bayonet in the front area.

In a further preferred version of the product support system according to the invention, the external tracks of the telescopic guides have a latch housed articulated and the internal tracks of the telescopic guides have a trap, the latch being able to be brought into engagement with the trap to prevent a movement of the internal track vis-à-vis the external track if the internal track is essentially completely pushed in. The effect of locking the internal track with the external track when the telescopic guide is completely pushed in, is that, during the removal of the product support unit from the oven, the telescopic guides are prevented from sliding apart due to friction of the external track against the wall-mounted holder, or when the product support unit is inclined. During the removal of the product support unit, the telescopic guide remains pushed together, which makes handling much easier.

In connection with this invention, "locking" describes a situation in which the internal track of the telescopic guide cannot be displaced vis-à-vis the external track. "Unlocking" means that the internal track can be displaced vis-à-vis the external track, i.e. the telescopic guide can be pulled out. "Arresting" of the external track on the side wall or on the wall-mounted holder describes a situation in which the external track cannot be displaced horizontally vis-à-vis the side wall.

For a simple withdrawal and insertion of the product support during baking or roasting, it is advantageous according to the invention if the tracks of the telescopic guides are housed above preferably caged ball-bearings, rollers or rolls and can be displaced against each other. Although telescopic guides with tracks which slide directly against each other are also suitable if costs for the caged telescopic guides are to be saved, such telescopic guides have a somewhat poorer sliding behavior. Of course, the telescopic guides according to the invention are provided with withdrawal limiters, as is normal for most telescopic guides, in order to prevent a complete pulling apart and separating of the tracks. It is also advantageous if the telescopic guides have one or more center tracks in addition to the internal track and the external track. The length of the telescopic guides is limited by the depth of the inside of the oven and therefore corresponds approximately to the depth of the product supports used. Longer telescopic guides would prevent a closing of the oven door. The pulling out of two telescopic guides against each other up to the withdrawal limit therefore corresponds at most to the length of the track in question, less the space occupied by the ball-bearings, rollers or rolls provided between the tracks. The better the sliding behavior of the telescopic guides, the more spheres, rollers or rolls are provided. If the product support is not additionally still displaceable forwards sliding on the telescopic guides, as is known from the state of the art, a withdrawal of the product support up to in front of the oven muffle can be carried out only with telescopic guides which have three or more tracks.

In a particularly preferred version of the product support system according to the invention insertion aids with upper guide surfaces running inclined upwards towards the muffle rear wall and/or lower guide surfaces running inclined downwards towards the muffle rear wall are provided on the wall-mounted holders or on the muffle side-wall near to the muffle rear wall. Such insertion aids or guide inclines facilitate the introduction of the product support unit into the rear attachment housing. The rear housing can thus be adapted more accurately and with less play to the external tracks to be received or the latch to be received on the external tracks, whereby the product support is in turn held more firmly in the oven muffle. The insertion aids facilitate the insertion of the product support unit without the operator having to precisely sight the rear housing devices. The insertion aids can guide on one side, e.g. only from underneath, to the correct height of the product support unit. It is however advantageous if guiding is from above and below.

The attachment of the product support system at the front advantageously takes place according to the invention at recesses in the side wall of the oven muffle or the front wall-mounted holders. The side-wall recesses expediently allow access from the front. This is realized, in the case of a side wall developed as a profile or folded sheet or wall-mounted holder, by having the side-wall opening extend from the section of the profile or of the sheet extending parallel to the muffle side wall over an edge or fold into a section of the profile or sheet extending essentially perpendicular thereto in the direction of the back wall of the muffle pointing towards the mouth of the muffle.

The side-wall openings also have a bayonet trap in the shape of a slit-shaped recess, open to the top, into which the bayonet can be locked by lowering. It is also expedient if the side-wall opening has, before the bayonet trap, a feed slope via which the bayonet can be introduced into the bayonet trap in a similar way, as for the insertion aids described above. The arrest of the external track takes place by locking of the bayonet into the bayonet trap, the bayonet being guided over the bayonet trap and fitted or locked into this by lowering. The external track of the product support unit is thus arrested against a horizontal displacement. The release of the arrest takes place by lifting the product support unit.

In order to prevent a release of the arrest of the product support unit through inadvertent lifting, or the inadvertent lifting itself, the latch of the product support system according to the invention advantageously has an upper stop surface, and the -side-wall recess an upper backstop, which are designed such that they limit a lifting of the product support unit if the latch is in an unlocking position.

The latch expediently has a detent, which is arranged such that, upon turning of the latch into a locking position, it engages with the trap of the internal track and the upper stop surface of the latch is developed such that, upon turning of the latch into the locking position, it is so far removed from the upper backstop of the side-wall opening that the bayonet can be completely guided out of the bayonet trap. It is thereby ensured that, when unlocking the external tracks to remove the product support unit, the telescopic guide is simultaneously secured against a sliding apart of the tracks. Thus the external tracks are unlocked, and the telescopic guide locked, in one step. The latch can be brought into the locking position by lifting the product support when it is inserted completely into the oven. The upper stop surface of the latch is pressed against the upper backstop of the side-wall opening and the latch turned about its fulcrum on the external track into the locking position.

However, this is possible only if the product support or the internal track is pushed completely into the telescopic guide and the detent can penetrate the trap on the internal track and engage with this. If the trap on the internal track is not located in the corresponding position, if the internal track is not completely pushed in, the latch cannot be moved from the unlocking position into the locking position, as then the detent comes to rest on the internal track and a further turning of the latch into the locking position is prevented. An unlocking of the external track from the wall-mounted holder is then not possible either, as the upper stop surface of the latch prevents the guiding out of the bayonet from the bayonet trap.

The latch can advantageously also have a lower stop surface and the side-wall opening a lower backstop which are designed such that the latch, which is located in the locking position when using the product support unit, moves into the unlocking position upon lowering of the product support unit to lock the bayonet. The latch is thus pushed or rotated upwards by the pressure of the lower backstop of the side-wall opening onto the lower stop surface of the latch. The product support unit is thus likewise arrested and unlocked in one stop.

In one version of the invention the latch also has a manual unlocking key with which the latch can be turned from the unlocking into the locking positions by pressing the key. The lower stop surface of the bar latch presses onto the lower backstop of the side-wall opening and in the process pushes or levers the product support unit upwards. Here there is again simultaneously a locking of the telescopic guide and an unlocking of the external track by lifting and guiding of the bayonet out of the bayonet trap.

BRIEF DESCRIPTION OF THE DRAWINGS

Further advantages, features and versions of the present invention will become clear with the help of reference to the following Figures and the associated description.

FIG. 8a shows a telescopic guide of the product support unit according to the invention in broken-off representation from the side, FIG. 8b shows a broken-off sectional representation looking in the direction of the arrow A in FIG. 8a.

DETAILED DESCRIPTION OF THE PREFERRED EMBODIMENT

Figure 1:
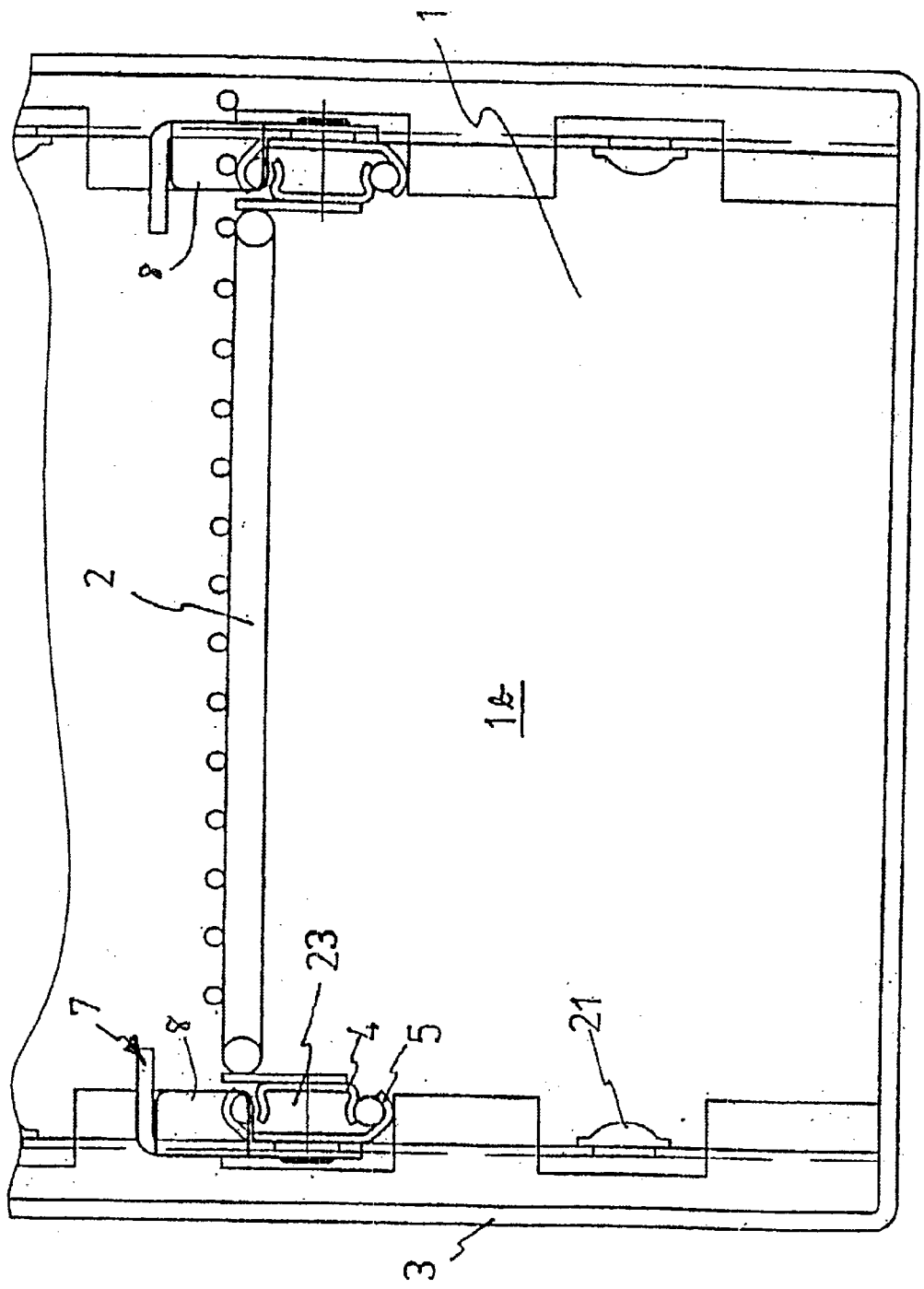
FIG. 1 shows a broken-off front side view of an oven space with inserted product support unit.
Figure 2:
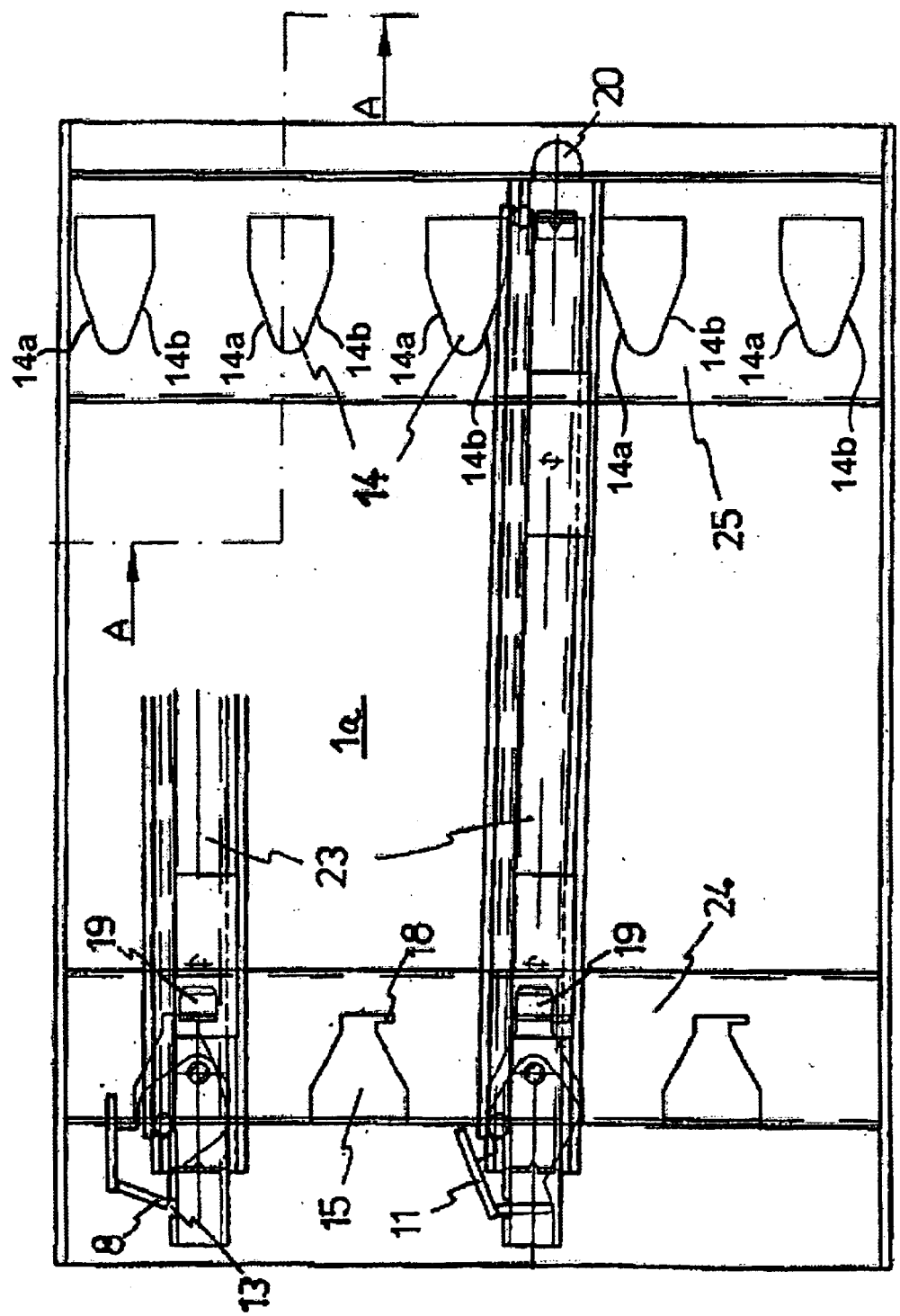
FIG. 2 shows a top view of the left-hand side wall of the oven from FIG. 1.
Figure 2B:
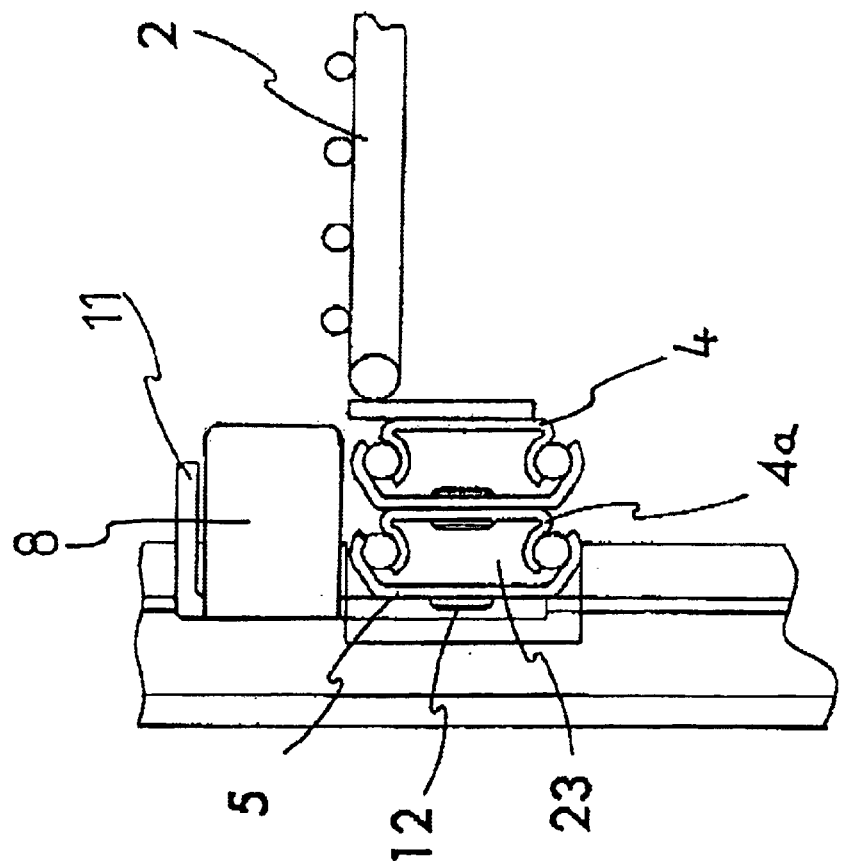
FIG. 2b shows a broken off front view of the telescopic guide with a center track.
Figure 2A:
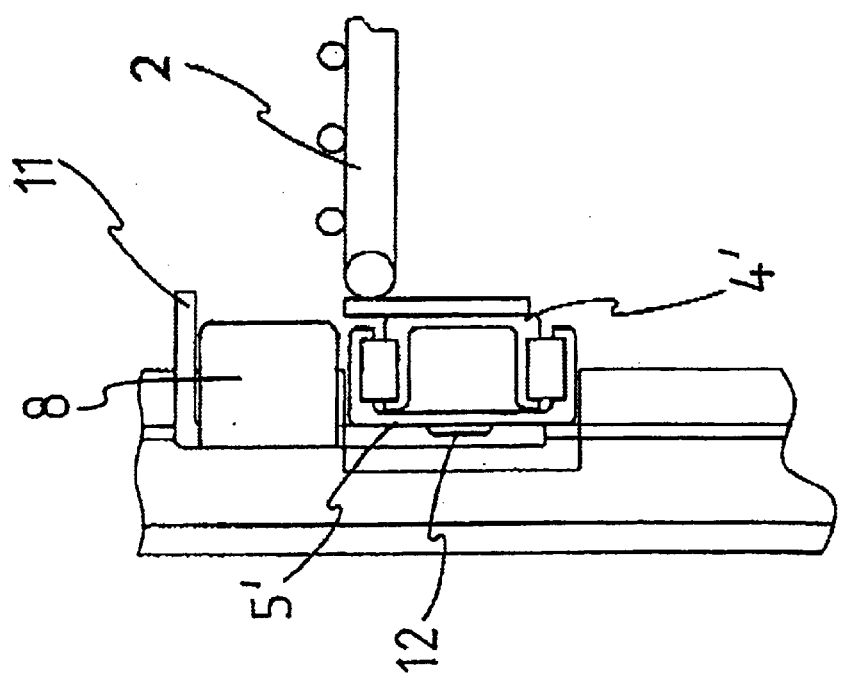
FIG. 2a shows a broken off front view of the telescopic guide with rollers.
Figure 3:
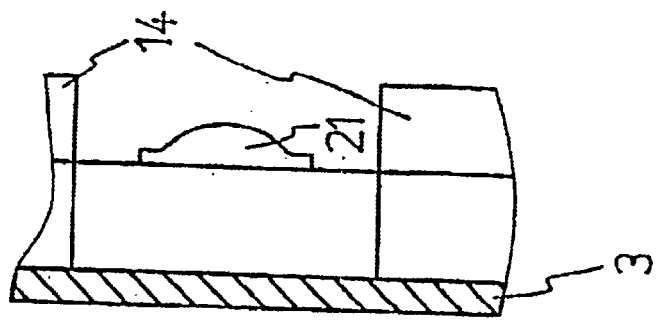
FIG. 3 shows a broken-off representation of the back wall-mounted holder, as seen in the direction of the arrow A in FIG. 2.
Figure 4:
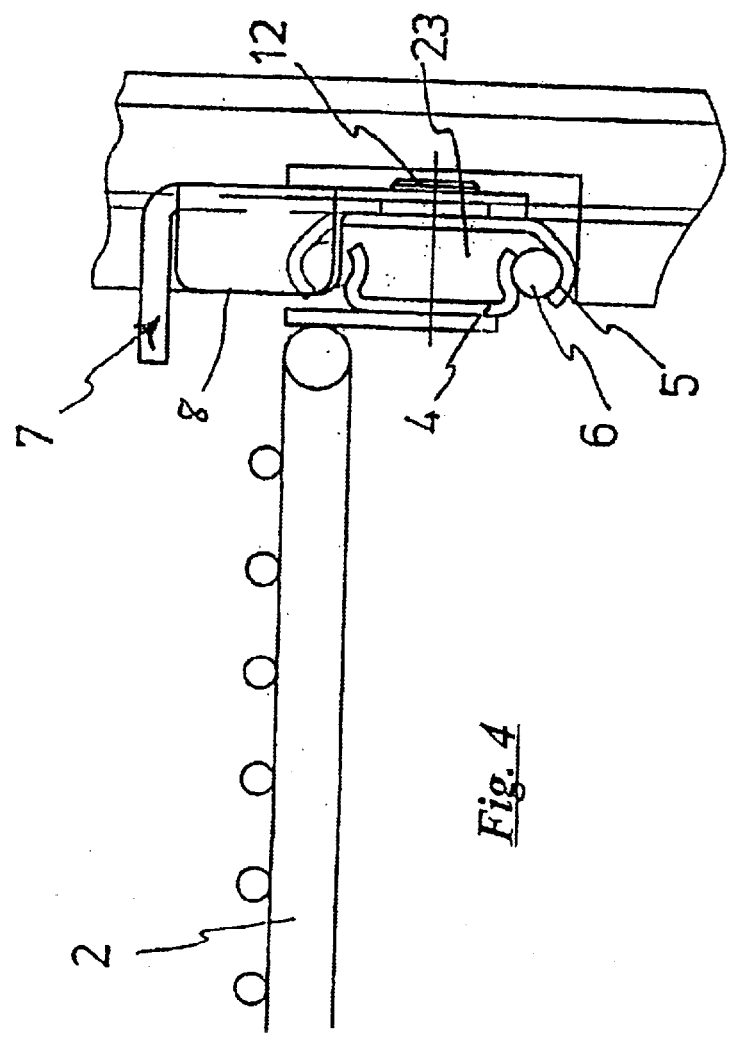
FIG. 4 shows a broken-off partial section from FIG. 1 in enlarged representation.

FIG. 1 shows an oven 1 with side walls 3 and a muffle rear wall 1b, in which a product support system according to the invention is arranged. As is represented in detail in FIG. 4, a product support 2 is firmly connected via a connection piece in each case on both sides to the internal track 4 of a telescopic guide 23. The telescopic guides each have an external track 5. The internal track 4 and external track 5 are housed and displaced against each other, over ball-bearings 6 (FIG. 4). Alternatively, rollers or rolls 6a (FIG. 2A) may be used, in which case they are positioned between internal track 4' and external track 5'. The present invention also contemplates alternative embodiments wherein the telescopic guides have three tracks: a center track 4a (FIG. 2B) positioned between external track 5 and internal track 4. In each embodiment a latch 7 is attached rotatably to the external track 5 via a joint bolt 12 and is comprised of detent 8, upper stop surface 9, lower stop surface 10 and manual unlocking key 11. The front and rear wall-mounted holders 24 and 25 consist, in the version represented in the Figures, of laterally folded-over sheets or profiles which, for releasable attachment of the product support unit, have side-wall openings 15 in the front area of the baking oven muffle and recesses 21 in the rear area of the muffle (FIG. 3). As can be seen in FIG. 2, the represented wall-mounted holders 24 and 25 are designed for an arrangement of product support units on four levels. The external track of the telescopic guide has a holding latch 20 at its end which is introduced into the recess 21 represented in FIG. 3 when the product support unit according to the invention is placed in the oven. In order to facilitate the process of introduction, insertion aids 14 with upper and lower guide inclines 14a and 14b, respectively are provided on the rear wall-mounted holder 25 for each level in the oven.

In the front section the external track 5 has a bayonet 19 which is designed as a latch which projects from the external track and extends essentially parallel to the latter towards the rear, as is shown in FIGS. 8a and 8b. FIG. 2 shows the two positions of the latch 7 when inserting or removing the product support unit according to the invention. In the case of the telescopic guide represented above in FIG. 2 and in FIG. 5 the latch 7 is located in an unlocking position, which it assumes when the product support unit is inserted in the oven and the external track 5 is arrested against a horizontal displacement by locking the bayonet 19 into the bayonet trap 18. The internal track 4 has a trap 13 for the latch 7, in which the detent 18 of the latch can engage, in order to lock the external track 5 and the internal track 4 against a displacement, as is represented in FIG. 2 at the bottom and in FIG. 6. In order to bring the latch into this locking position, the trap 13 on the internal track 4 has to be moved under the detent 8, i.e. the internal track 4 has to be pushed into the telescopic guide 23. The locking takes place by lifting the product support unit at the front, the bayonet 19 being simultaneously lifted out of the bayonet trap 18 and the external track 5 thus released from its arrest against a horizontal removal from the oven. In the version represented in the Figures, the latch 7 has a manual unlocking key 11 with which the locking can also be carried out. The latch 7 has a lower stop surface 10 and the side openings a lower backstop 17 which are pushed against each other when the unlocking key 11 is pressed down or the latch is turned into the locking position. The entire product support unit is thereby pushed up by the latch 7 over the hinge bolt 12 and in the process the bayonet 19 is also lifted out of the bayonet trap 18. Thus, in order to remove the product support unit from the oven, either the front side of the product support unit can be lifted or the unlocking key 11 of the latch 7 can be pressed down.

Figure 5:
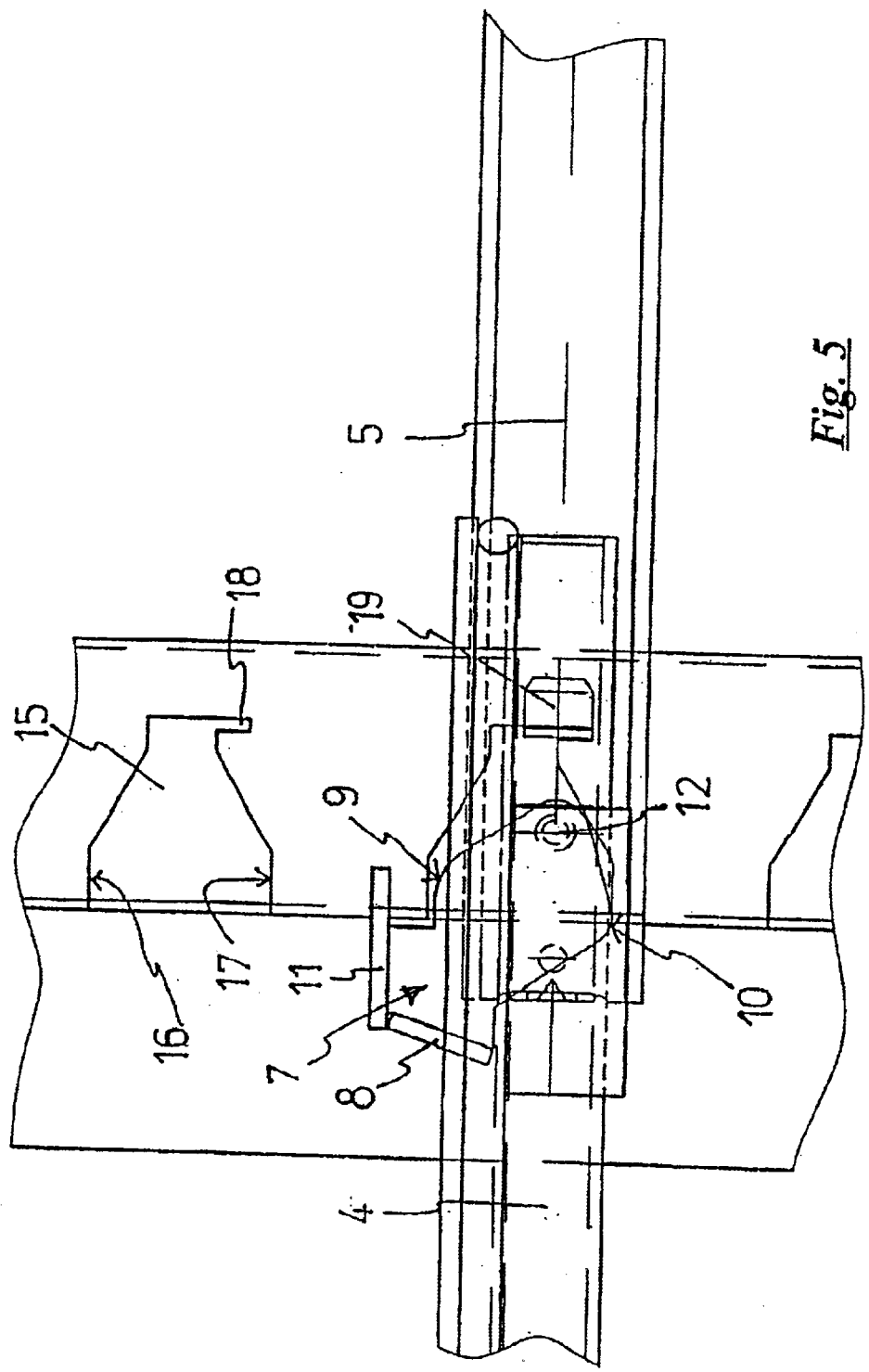
FIG. 5 shows the telescopic guide and the wall-mounted holder of the product support unit according to the invention when extended in broken-off representation from the side.
Figure 6:
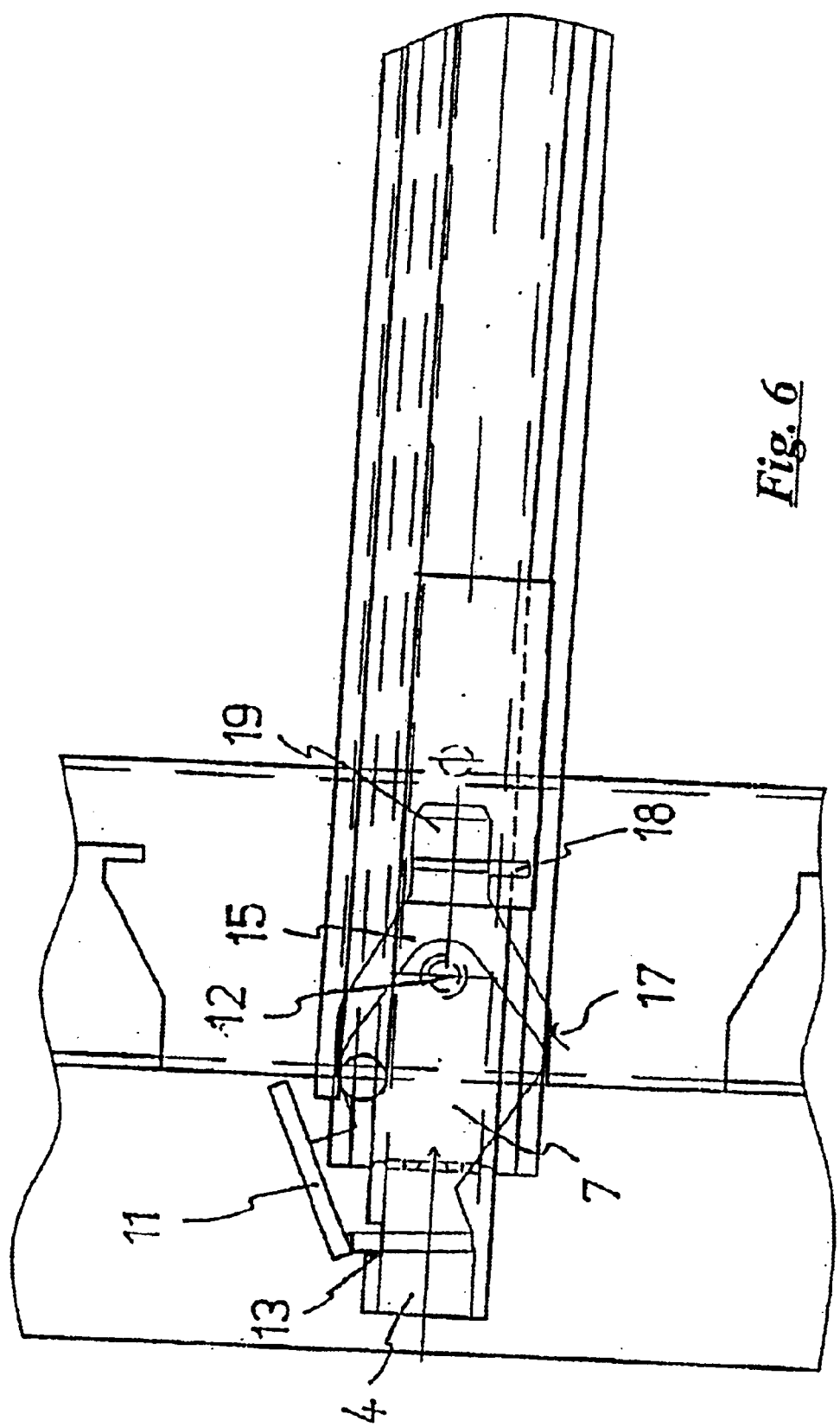
FIG. 6 shows the telescopic guide and the wall-mounted holder of the product support according to the invention when extended in broken-off representation from the side, FIG. 7a show the latch of the telescopic guide of the product support unit according to the invention from the side and 7b and from the front, respectively.

As is represented in FIG. 5, the latch 7 has an upper stop surface 9 and the side-wall opening 15 an upper backstop 16 which in the unlocking position limit a lifting of the product support unit and thus block a lifting of the bayonet 19 out of the bayonet trap 18. When the internal track is pulled out, as is represented in FIG. 5, the detent 8 of the latch 7 can be turned down no further than the lower edge of the internal track 4, whereby the latch is kept in the unlocking position and the upper stop surface of the latch 9 cannot remove itself from the backstop, 16 of the side-wall opening 15. When the product support is pulled out an inadvertent unlocking of the bayonet 19 from the bayonet trap 18 is thus prevented.

Reference List

1 Oven space
1a Muffle side wall
1b Muffle rear wall
2 Product support unit
3 Side wall
4 Internal track
4' Internal track
4a Center track
5 External track
5' External track
6 Ball-bearings
6a Rollers
7 Latch
8 Detent
9 Upper stop surface of the latch
10 Lower stop surface of the latch
11 Manual unlocking key
12 hinge bolt
13 trap on the internal track
14 Insertion aid
14a Upper guide incline
14b lower guide incline
15 Side-wall opening
16 Upper backstop of the side-wall opening
17 Lower backstop of the side-wall opening
18 Bayonet trap
19 Bayonet
20 Holding latch
21 Recess for holding latch
23 Telescopic guide
24 Front wall-mounted holder
25 Rear wall-mounted holder

What I claim is:

1. An apparatus for supporting a product in an oven having a muffle with side walls, a rear wall and a mouth, said apparatus comprising at least one product support, at least one pair of telescopic guides, each guide having at least one internal track and at least one external track, and wall-mounted holders arranged on said side walls of said muffle operatively arranged for releasable attachment of said telescopic guides at different levels of said muffle, said product support connected to said telescopic guides to form a product support unit, said product support unit operatively arranged to be removable from said oven, said external tracks of said telescopic guides comprising a latch and said internal track of said telescopic guides comprising a trap, said latch operatively arranged to engage said trap to prevent movement of said internal track relative to said external track when said internal track is proximate to said rear wall of said muffle.

2. The apparatus recited in claim 1, wherein said wall-mounted holders comprise projections proximate to said rear wall of said muffle, said projections operatively arranged to receive said external tracks of said telescopic guides during horizontally directed movement of said external tracks relative to said projections.

3. The apparatus recited in claim 1, wherein said wall-mounted holders comprise recesses proximate to said rear wall of said muffle, said recesses operatively arranged to receive said external tracks of said telescopic guides during horizontally directed movement of said recesses and said external tracks relative to said recesses.

4. The apparatus recited in claim 1, wherein said wall-mounted holders comprise projections proximate to said rear wall of said muffle, said projections operatively arranged to receive holding latches of said external tracks during horizontally directed movement of said external tracks relative to said projections, said holding latches proximate a rear end of said external tracks.

5. The apparatus recited in claim 1, wherein said wall-mounted holders comprise recesses proximate to said rear wall of said muffle, said recesses operatively arranged to receive holding latches of said external tracks during horizontally directed movement of said external tracks relative to said recesses, said holding latches proximate a rear end of said external tracks.

6. The apparatus recited in claim 1, wherein said wall-mounted holders comprise side-wall openings proximate to said mouth of said muffle, and said external tracks of said telescopic guides comprise bayonets operatively arranged to engage with said side-wall openings.

7. The apparatus recited in claim 6, wherein said external tracks of said telescopic guides are operatively arranged to be locked in said side wall to prevent horizontally directed movement of said external tracks relative to said side wall.

8. The apparatus recited in claim 6, wherein said side-wall opening further comprises a bayonet trap operatively arranged to receive said bayonet, said bayonet trap operatively arranged to prevent relative movement between said trap and said bayonet.

9. The apparatus recited in claim 6, wherein said side-wall opening comprises an upper backstop, said upper backstop operatively arranged to limit a lifting of said product support system when said latch is located in an unlocking position.

10. The apparatus recited in claim 1, wherein said internal and said external tracks of said telescopic guides comprise means for horizontally directed movement of said internal tracks relative to said external tracks.

11. The apparatus recited in claim 10, wherein said means for horizontally directed movement comprises caged ball-bearings.

12. The apparatus recited in claim 10, wherein said means for horizontally directed movement comprises rollers.

13. The apparatus recited in claim 1, wherein said telescopic guides further comprise one or more center tracks.

14. The apparatus recited in claim 1, wherein said wall-mounted holders further comprise at least one insertion aid comprising upper guide surfaces running inclined upwardly towards said muffle rear wall.

15. The apparatus recited in claim 1, wherein said wall-mounted holders further comprise at least one insertion aid comprising lower guide surfaces running inclined downwardly towards the muffle rear wall.

16. The apparatus recited in claim 1, wherein said muffle side-wall further comprises at least one insertion aid proximate said muffle rear wall, said at least one insertion aid comprising upper guide surfaces running inclined upwardly towards said muffle rear wall.

17. The apparatus recited in claim 1, wherein said muffle side-wall further comprises at least one insertion aid proximate said muffle rear wall, said at least one insertion aid comprising lower guide surfaces running inclined downwardly towards the muffle rear wall.

18. The apparatus recited in claim 1, wherein said latch comprises an upper stop surface, said upper stop surface operatively arranged to limit a lifting of said product support system when said latch is located in an unlocking position.

19. The apparatus recited in claim 18, wherein said latch comprises a detent, said detent operatively arranged to engage with said trap of said internal track when said latch is in a locking position.

20. The apparatus recited in claim 18, wherein said upper stop surface of said latch is operatively arranged to allow said bayonet to be removed from said bayonet trap when said latch is in a locking position.

21. An apparatus for supporting a product in an oven comprising:
   a product support; and
   at least one pair of telescopic guides, each guide having at least one internal track and at least one external track to translate said product support from a position proximate a rear wall of said oven to a position substantially outside said oven, said telescopic guides connected to said product support, said telescopic guides operatively arranged to be releasably attached to walls of said oven, said external tracks of said telescopic guides comprising a latch, said internal track of said telescopic guides comprising a trap, said latch operatively arranged to engage said trap to prevent movement of said internal track relative to said external track when said internal track is proximate to said rear wall of said oven,
   wherein said apparatus is operatively arranged to be removable from said oven as a unit.

22. The apparatus recited in claim 21 wherein said telescopic guides are releasably connected to said product support.

* * * * *